United States Patent
Branham et al.

(10) Patent No.: US 6,966,355 B2
(45) Date of Patent: Nov. 22, 2005

(54) SIDE MOUNTED CONDENSER FOR A SKID STEER LOADER

(75) Inventors: Douglas G. Branham, Burnham, PA (US); Homauon Hal Noroozi, Rockford, MI (US); Dennis Arthur Fraser, Rockford, MI (US); Benard Lee Allers, Marne, MI (US); David Charles Cushway, Big Rapids, MI (US)

(73) Assignee: CNH America, Inc., New Holland, PA (US)

( * ) Notice: Subject to any disclaimer, the term of this patent is extended or adjusted under 35 U.S.C. 154(b) by 287 days.

(21) Appl. No.: 10/193,707

(22) Filed: Jul. 12, 2002

(65) Prior Publication Data

US 2004/0007346 A1 Jan. 15, 2004

(51) Int. Cl.7 .................................................. B60H 1/32
(52) U.S. Cl. ............................ 165/41; 165/51; 165/67; 165/77; 165/86; 165/110; 165/149; 180/68.1; 180/68.4; 62/278
(58) Field of Search ........................... 165/41, 67, 149, 165/77, 110, 51, 86; 180/68.1, 68.4; 62/278

(56) References Cited

U.S. PATENT DOCUMENTS

| | | | |
|---|---|---|---|
| 3,834,478 A | * | 9/1974 | Alexander et al. ............. 165/77 |
| 4,531,574 A | * | 7/1985 | Hoch ............................ 165/41 |
| 4,730,664 A | | 3/1988 | Forsthuber et al. |
| 4,825,815 A | | 5/1989 | Turner |
| 5,492,167 A | | 2/1996 | Glesmann |
| 6,024,164 A | * | 2/2000 | Sorbel .......................... 165/77 |
| 6,092,616 A | | 7/2000 | Burris et al. |
| 6,105,660 A | * | 8/2000 | Knurr ........................... 165/41 |
| 6,223,807 B1 | | 5/2001 | Asche et al. |
| 6,318,450 B1 | | 11/2001 | Acre |

FOREIGN PATENT DOCUMENTS

| | | | | |
|---|---|---|---|---|
| JP | 62160914 A | * | 7/1987 | ............ B60H 1/32 |
| JP | 2003159932 A | * | 6/2003 | ............ B60H 1/32 |

* cited by examiner

Primary Examiner—John K. Ford
(74) Attorney, Agent, or Firm—John William Stader

(57) ABSTRACT

A work vehicle having a body and a heater A/C unit disposed inside the body with a condenser assembly connected to the heater A/C unit has the condenser assembly disposed on a lateral side of the body, the condenser assembly includes: a first mounting bracket disposed on the side of the body; a second mounting bracket disposed on the side of the body; a third mounting bracket disposed on the side of the body; and a planar condenser disposed in a frame, wherein the frame is pivotally connected on a first side to the first mounting bracket, and a second side opposite to the first side has a right wing and a left wing, wherein the second mounting bracket detachably connects to the left wing and the third mounting bracket detachably connects to the right wing, and the condenser is connected to the heater A/C unit by a conduit.

10 Claims, 5 Drawing Sheets

SIDE MOUNTED CONDENSER FOR A SKID STEER LOADER

FIELD OF THE INVENTION

The present invention relates generally to a condenser assembly for a work vehicle, such as a skid steer loader, that has a heater A/C unit. More particularly, the invention pertains to an improved condenser assembly that is mounted on a lateral side of the work vehicle in a pivotal manner to facilitate cleaning and maintenance.

BACKGROUND OF THE INVENTION

In the art of manufacturing large work vehicles that include a condenser assembly connected to a heater A/C unit, it is known that the condenser assembly typically includes a condenser mounted in a frame that is disposed in front of the radiator or on a portion of the work vehicle body such as a lid on top of the engine. In compact work vehicles, such as skid steer loaders, space is limited and there is no room near or on these structures to place a condenser assembly. Typically, condensers, evaporators and heater cores that provide at least a portion of an HVAC system have been placed under the seats of the operator cab where space is severely restricted, or they have been placed on another portion of the loader's cab. One such heating, ventilating and air conditioner system for a skid steer loader (also simply referred to as a "steers") disclosed in U.S. Pat. No. 6,223,807 to Asche et al. teaches an air conditioning system evaporator disposed in front of the engine of the steers and behind the operator's seat. However, this and similar locations about the cab are difficult to reach should the evaporator of the HVAC system require repair or cleaning. Hence, there is a need to restructure the mounting of a condenser assembly to another part of the steers or like work vehicle where there is room for such an assembly so that the condenser assembly is readily accessible for routine and emergency maintenance procedures and cleaning.

An object of the present invention is to provide an improved condenser assembly for a work vehicle that is mounted on a lateral side of the work vehicle in a pivotal manner to overcome the disadvantages of the prior art condenser assemblies.

A further object of the present invention is to overcome the disadvantages of the prior art condenser assemblies.

A still further object of the present invention is to provide a condenser assembly for a work vehicle, wherein the condenser assembly is easy to clean and positioned to facilitate maintenance.

SUMMARY OF THE INVENTION

In accordance with the above objectives, the present invention provides a work vehicle having a body, a heater A/C unit disposed inside the body, and a condenser assembly connected to the heater A/C unit and disposed on a lateral side of the body. The condenser assembly comprises a first mounting bracket disposed on the lateral side of the body. A second mounting bracket is provided disposed on the lateral side of the body. A third mounting bracket is also provided disposed on the lateral side of the body. The invention also includes a planar condenser having a frame with two sides, a top and a bottom. The bottom of the frame is pivotally connected to the first mounting bracket. The top of the frame has a right wing and a left wing, wherein the second mounting bracket is detachably connected to the left wing and the third mounting bracket is detachably connected to the right wing.

In accordance with a preferred embodiment, the first, second and third mounting brackets are positioned about the apices of a triangle.

In accordance with a still further embodiment, the right wing and the left wing each have a throughhole formed therein and the second bracket has a throughhole formed therein that aligns with the throughhole of the left wing and the third bracket has a throughhole formed therein that aligns with the throughhole of the right wing. In this embodiment, the condenser further comprises a left latch pin to latch through the left wing and second bracket, and a right latch pin to latch through the right wing and third bracket, respectively.

In accordance with yet another embodiment, the right wing and the left wing each have an L-shaped cross section and the second mounting bracket and the third mounting bracket each have a latch portion having an L-shaped cross section disposed to matingly engage with a corresponding one of the wings having an L-shaped cross section.

In accordance with a still further embodiment, a conduit is provided disposed adjacent the bottom and on a side opposite the first bracket.

DETAILED DESCRIPTION OF THE PREFERRED EMBODIMENTS

Figure 1:
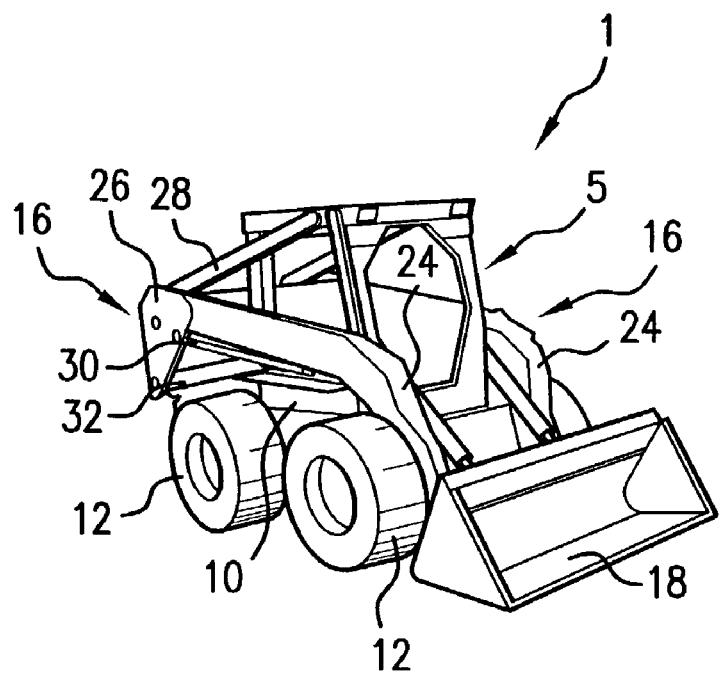
FIG. 1 is a schematic front perspective view of a work vehicle in accordance with the present invention.

The machine of the present invention shown in FIG. 1 is a compact work vehicle 1, such as a skid steer loader or other like work vehicle, that includes a HVAC system for heating and air conditioning a cab compartment 5 of the vehicle. Typically, work vehicle 1 is of a conventional design and includes a body 10 that is mounted on wheels 12 that are rotatingly connected to a transmission powered by an engine disposed in the body. One skilled in the art would realize that the work vehicle 1 could be a tracked vehicle, mounted on rails, or could be mounted to a stationary frame without departing from the scope of the present invention.

Work vehicle 1 includes boom arm assemblies 16 that are pivotally connected to the body 10 at one end, and that are connected to a work implement 18, such as a loader bucket or other useful tool, at the other end. Thus, boom arm assemblies 16 can be raised and lowered using hydraulic power as is generally known so that the implement 18 can be used to perform its designed function.

Figure 2:
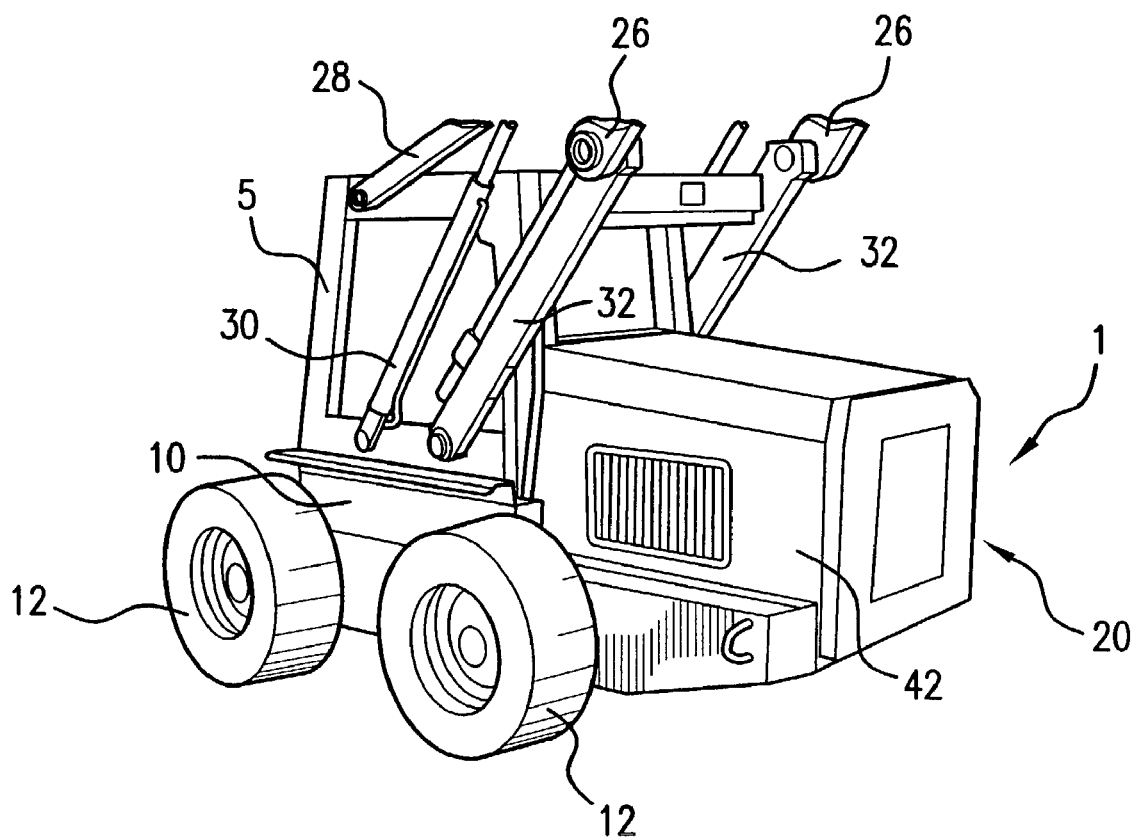
FIG. 2 is a schematic rear perspective view of the work vehicle with the boom arms rotated away from the engine housing.

As shown in FIGS. 1 and 2, work vehicle 1 achieves its compact structure because the boom arm assemblies 16 can rotate away from engine housing 29 that is pan of body 10 so that access to the engine 40 is provided. Each boom arm assembly 16 includes a boom arm 24 attached to a triangular plate member 26 at one end and to the implement 18 at the other end. Upper and lower link members 28 and 32, respectively, are also pivotally attached to triangular member 26 at one end and pivotally attached to the cab compartment 5 on another end. Extending arm 30 is preferably a hydraulic cylinder device that provides the power for lifting and rotating the boom arm assembly 16 away from the engine housing 20 so that the boom arms 24 can be moved from the working position shown in FIG. 1 to the raised and rotated maintenance position shown in FIG. 2. Extending arm 30 is rotatingly attached to body 10 at one end and to triangular plate member 26 at another end. So that extending arm 39 can rotate past lower link member 32 when arm 30 is extended, both rotating ends of arm 30 are disposed further away from body 10 than lower link 32. Triangular member 26 rotates about the ends of upper and lower link members 28, 32, when extending arm 30 is extended, thereby rotating boom arm assemblies 16 away from engine housing 20 to an upward maintenance position shown in FIG. 2.

Figure 3:
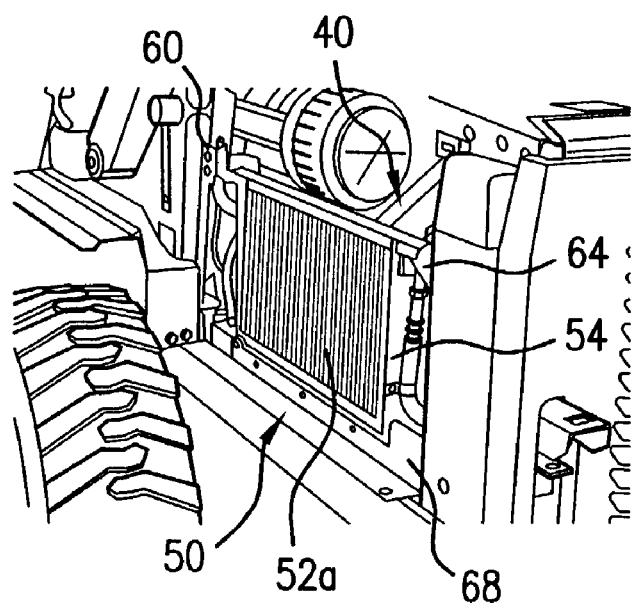
FIG. 3 is a close up perspective drawing of the work vehicle with the boom arms rotated away from the engine housing and with the side cover removed.

With the boom arm assemblies 16 in an upward maintenance position, (i.e. both lifted and rotated away from engine housing 20), access to the engine 40 can be achieved by removing detachable engine side cover 42 as shown in FIG. 3. With side cover 42 removed, both engine 40 and condenser assembly 50 can be viewed and accessed for routine and emergency maintenance operations and for cleaning procedures.

Condenser assembly 50 includes a planar condenser 52 as is conventionally known in HVAC systems having a heater A/C unit with a condenser. Condenser 52 has an outer face 52*a* and an inner face 52*b* (compare FIGS. 3 and 7). Condenser 52 is disposed in four-sided mounting frame 54 that is used to pivotally mount the condenser to the engine housing 20. Frame 54 has an elongated hinge 56 attached to one side, and on the side opposite the hinge there are right and left wings 57. Each wing 57 has an L-shaped cross section with a throughhole 58 formed therein on an upper portion of the L-shaped cross section. Each throughhole 58 is shaped to receive a latch pin 70.

Figure 4A:
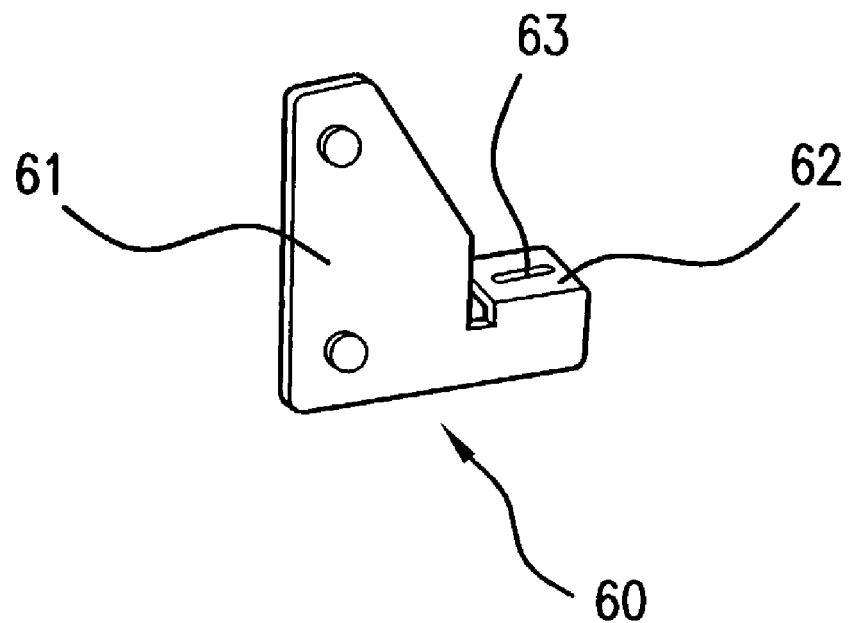
FIG. 4a illustrates the left sided bracket.

The condenser mounting assembly includes three mounting brackets 60, 64, and 68 positioned about the apices of a triangle to provide three attachment regions for securing the frame 54 to the engine housing 20. Bracket 60 as shown in FIG. 4*a* is a left sided bracket and has a housing portion 61, and a latch portion 62 having an L-shaped cross section for mating with the corresponding L-shaped wing 57. Housing portion 61 is constructed so that bracket 60 is connected to the engine housing 20 at the housing portion 61, either by use of fasteners such as bolts or screws or by use of a weld. Latch portion 62 has a throughhole 63 formed therein so that corresponding throughhole 58 (see FIG. 7) is capable of being positioned to align with throughhole 63 to allow latch pin 70 to be placed simultaneously into both holes 58 and 63 to effect a latch (see FIG. 6*a*).

Figure 4B:
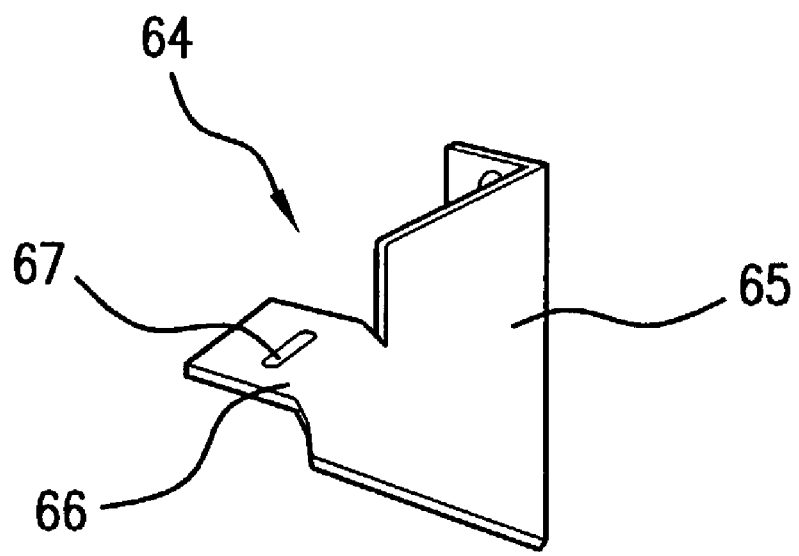
FIG. 4b illustrates the right-sided bracket.

In a similar manner, bracket 64 as shown in FIG. 4*b* is a right sided bracket and has a housing portion 65, and a latch portion 66 having an L-shaped cross section for mating with the corresponding L-shaped wing 57. Housing portion 65 is constructed so that bracket 64 is connected to the engine housing 20 at the housing portion 65, either by use of fasteners such as bolts or screws or by use of a weld. Latch portion 66 has a throughhole 67 formed therein so that corresponding throughhole 58 is capable of being positioned to align with throughhole 67 to allow latch pin 70 to be placed simultaneously into both holes 58 and 67 to effect a latch.

Figure 5:
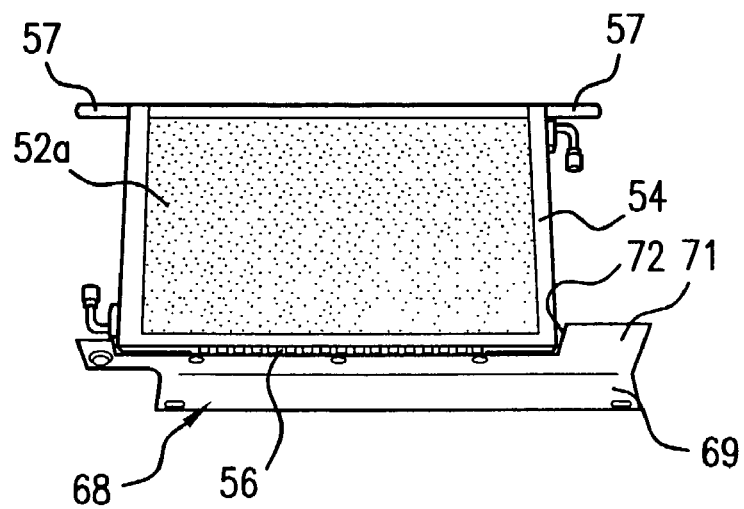
FIG. 5 shows the condenser and frame mounted to the elongated bracket.

Bracket 68 as shown in FIG. 5 is an elongated bracket having a portion with an L-shaped cross section defined by a first leg 69 and a second leg 71. Bracket 68 is connected to the engine housing 20 at the first leg 69, either by use of fasteners such as bolts or screws or by use of a weld. The second leg 71 has a condenser recess 72 formed therein, which is shaped to receive condenser 52 in mounting frame 54 so that the condenser in the mounting frame may move in the recess 72. Frame 54 is connected to the second leg 71 of bracket 68 by the elongated hinge 56, preferably by using fasteners such as bolts or screws. One skilled in the art would appreciate that the single lengthy elongated hinge 56 could be replaced with two or more shorter hinges without departing from the scope of the present invention. Because condenser 52 in mounting frame 54 is connected to bracket 68 by hinge 56, the condenser assembly 50 has the feature that condenser 52 is pivotally mounted to the engine housing 20 so that the condenser can be pivoted about the axis of the hinge to expose the inner face 52*b* and the engine 40.

Figure 6A:
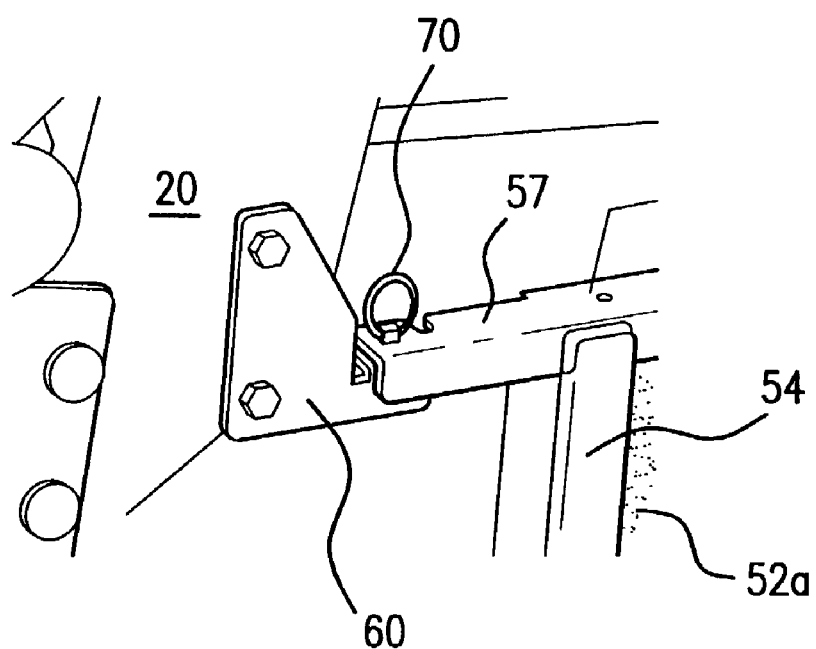
FIG. 6a illustrates the left sided bracket latched to the left wing of the mounting frame.
Figure 6B:
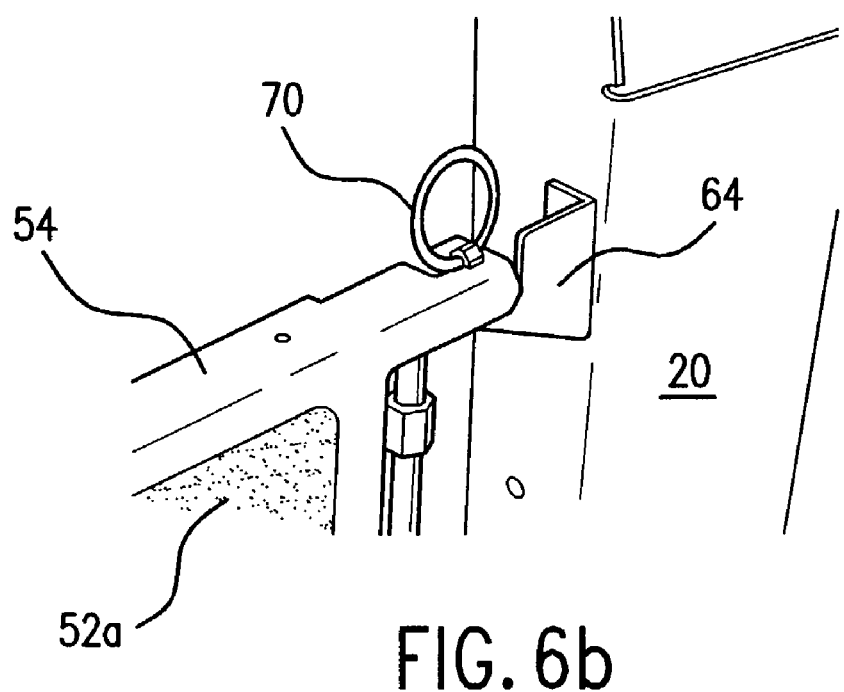
FIG. 6b illustrates the right-sided bracket latched to the right wing of the mounting frame.
Figure 7:
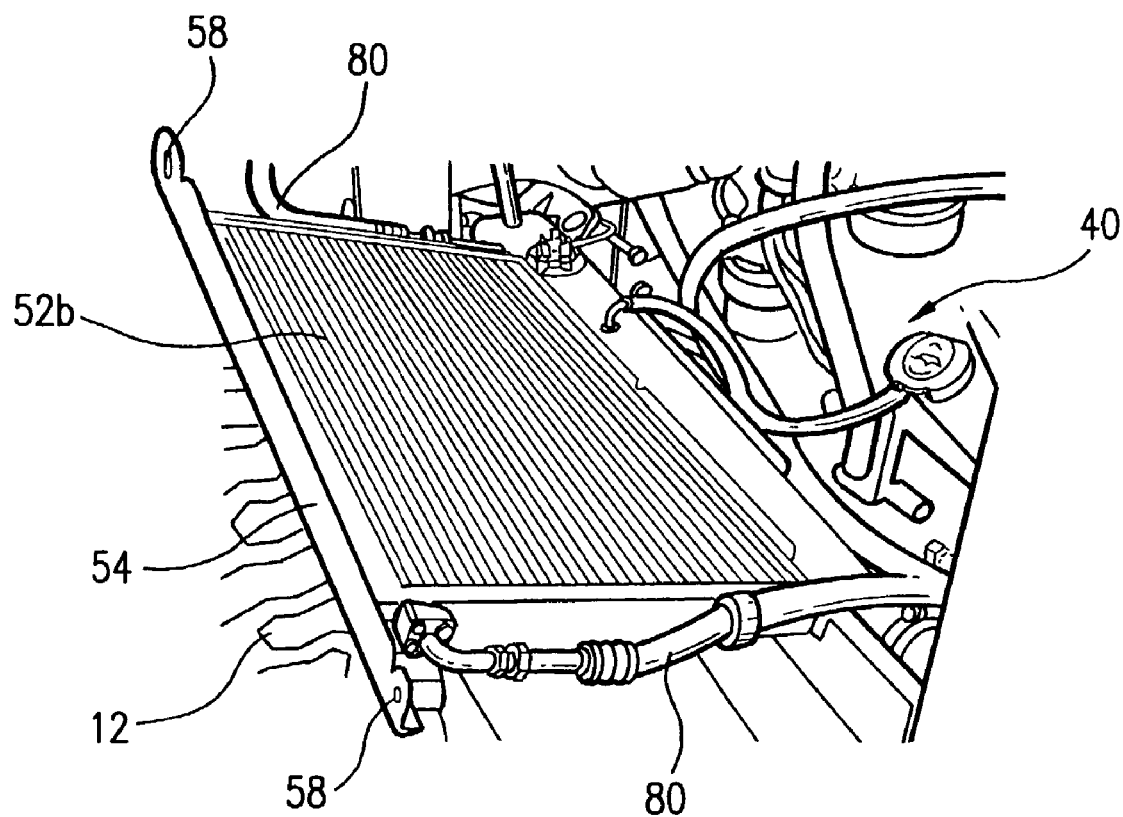
FIG. 7 illustrates the condenser in a pivoted, unlatched position.

As evident from FIGS. 3 and 7, condenser 52 has an upright, latched position as shown in FIG. 3, and a pivoted, unlatched position as shown in FIG. 7. When the condenser 52 is in the upright position, it is securely latched in place to brackets 60 and 64 by latch pins 70 as shown in FIGS. 6*a* and 6*b*, thereby exposing outer face 52*a*. When condenser 52 is in the pivoted position, the inner face 52*b* and the engine 40 are exposed and made accessible for maintenance, repair or cleaning. Also shown in FIG. 7 is the fact that the condenser 52, being a portion of the HVAC system of the steers 1, is connected to the hoses or other suitable conduits 80 of the heater A/C unit that also provides a portion of the HVAC system.

While the present invention has been described with reference to certain preferred embodiments, one of ordinary skill in the art will recognize that additions, deletions, substitutions, modifications, and improvements can be made while remaining within the spirit and scope of the present inventions as defined by the appended claims.

What is claimed is:

1. A work vehicle having a body with a front and back and two lateral sides, a heater A/C unit disposed inside the body, and a condenser assembly connected to the heater A/C unit and disposed on a lateral side of the body, the condenser assembly comprising:
   a first mounting bracket disposed on the lateral side of the body;
   a second mounting bracket disposed on the lateral side of the body;
   a third mounting bracket disposed on the lateral side of the body; and
   a planar condenser having a frame with two sides, a top and a bottom, wherein the bottom of the frame is pivotally connected to the first mounting bracket, wherein the top of the frame has a right wing and a left wing, wherein the second mounting bracket is detachably connected to the left wing and the third mounting bracket is detachably connected to the right wing.

2. A work vehicle as recited in claim 1, wherein the first mounting bracket is connected to the bottom of the condenser frame and the second and third mounting brackets are connected to the top of the condenser frame.

3. A work vehicle as recited in claim 1, wherein an elongated hinge pivotally connects the bottom of the frame to the first mounting bracket.

4. A work vehicle as recited in claim 1, wherein the right wing and the left wing each have a throughhole formed therein and the second bracket has a throughhole formed therein that aligns with the throughhole of the left wing and the third bracket has a throughhole formed therein that aligns with the throughhole of the right wing, and wherein the condenser further comprises a left latch pin to latch through the left wing and second bracket, and a right latch pin to latch through the right wing and third bracket, respectively.

5. A work vehicle as recited in claim 2, wherein the right wing and the left wing each have a throughhole formed therein and the second bracket has a throughhole formed therein that aligns with the throughhole of the left wing and the third bracket has a throughhole formed therein that aligns with the through hole of the right wing, and wherein the condenser further comprises a left latch pin to latch through the left wing and second bracket, and a right latch pin to latch through the right wing and third bracket, respectively.

6. A work vehicle as recited in claim 1, wherein the right wing and the left wing each have an L-shaped cross section and the second mounting bracket and the third mounting bracket each have a latch portion having an L-shaped cross section disposed to matingly engage with a corresponding one of the wings having an L-shaped cross section.

7. A work vehicle as recited in claim 5, wherein the right wing and the left wing each have an L-shaped cross section and the second mounting bracket and the third mounting bracket each have a latch portion having an L-shaped cross section disposed to matingly engage with a corresponding one of the wings having an L-shaped cross section.

8. A work vehicle as recited in claim 2, further comprising a conduit disposed adjacent a side of said condenser frame opposite the first bracket.

9. A work vehicle as recited in claim 4, further comprising a conduit disposed adjacent a side of said condenser frame opposite the first bracket.

10. A work vehicle as recited in claim 7, further comprising a conduit disposed adjacent a side of said condenser frame opposite the first bracket.

* * * * *